(12) United States Patent
Walker et al.

(10) Patent No.: US 7,645,472 B2
(45) Date of Patent: Jan. 12, 2010

(54) METHOD FOR RECYCLING LIQUIDS FOR TREATING FOOD

(75) Inventors: Mathew Edward Walker, Acworth, GA (US); Ralf Ludwig, Tilson, NY (US); Paul Lawrence Wilson, Ballston Spa, NY (US)

(73) Assignee: Wolf-Tec, Inc., Kingston, NY (US)

( * ) Notice: Subject to any disclaimer, the term of this patent is extended or adjusted under 35 U.S.C. 154(b) by 746 days.

(21) Appl. No.: 10/926,087

(22) Filed: Aug. 26, 2004

(65) Prior Publication Data

US 2005/0069613 A1 Mar. 31, 2005

Related U.S. Application Data

(60) Provisional application No. 60/498,967, filed on Aug. 29, 2003.

(51) Int. Cl.
*A47F 3/04* (2006.01)
(52) U.S. Cl. .................. 426/478; 426/425; 426/480; 426/490; 426/506; 426/518; 426/246; 426/281
(58) Field of Classification Search ............... 426/425, 426/480, 490, 506, 518, 246, 281
See application file for complete search history.

(56) References Cited

U.S. PATENT DOCUMENTS 3,814,814 A * 6/1974 Wallace ................. 426/2
4,276,313 A * 6/1981 Rose ..................... 426/247
4,343,821 A * 8/1982 Rose ..................... 426/247
4,402,987 A 9/1983 von Lersner et al.
5,142,971 A * 9/1992 Norrie .................... 99/487
5,830,525 A 11/1998 Cozzini et al.

FOREIGN PATENT DOCUMENTS

EP 0 419 080 A2 3/1991
EP 0 479 447 A1 4/1992

* cited by examiner

*Primary Examiner*—Anthony Weier
(74) *Attorney, Agent, or Firm*—Boyle Fredrickson, S.C.

(57) ABSTRACT

A return liquid containing particles resulting from treating food is treated to reduce the size of the particles and recycled for further food treatment. Embodiments include injecting a solution into a body of meat, recovering a return solution containing particulate material resulting from injecting the body of meat, optionally reducing the temperature of the return solution, mechanically reducing the particle size of the particulate material in the return solution to form a reduced return solution, conveying the reduced return solution to a holding tank and recycling the reduced return solution for injection into a body of meat. Embodiments also include a system for recycling a food treating liquid including a mechanical milling device, an optional chilling device, and a holding tank including first, second and third sections, a first weir separating the first and second sections, and a second weir separating the second and third sections, wherein the second weir extends higher than the first weir.

14 Claims, 1 Drawing Sheet

METHOD FOR RECYCLING LIQUIDS FOR TREATING FOOD

RELATED APPLICATION

This application is entitled to and claims the benefit of the filing date of provisional application Ser. No. 60/498,967 filed on Aug. 29, 2003, the entire disclosure of which is incorporated by reference herein.

FIELD OF THE INVENTION

The present invention relates to a method and system for recycling liquids used to treat food. The present invention is particularly applicable in recycling solutions, used to inject bodies of meat, which contain particulate material from processing the bodies of meat.

BACKGROUND ART

There are various aspects of the food processing industry wherein food is treated with a liquid. For example, conventional practices include treating muscle groups and flesh from animals, beef, pork, poultry and fish with liquids which contain bacteria controls, cures, flavorings and various binders and enhancers. Liquid recovered from such food treatment frequently contains particles resulting from such treatment. These particles prevent efficient recycling of the return liquid, as for reuse in an injector, and reduce the green weight value if not returned.

The presence of particulate material in a return liquid is particularly problematic in food treating systems containing injection devices for injecting various types of liquids into bodies of meat through needles. Such liquids are built on formulations made up of various ingredients, but based primarily on water. Depending on the particular application, these basic solutions may contain additional components such as sugar, flavorings, anti-microbial additives, starches and proteins. The solutions are typically employed for curing, marinating or yield improvement. Conventional practices comprise injecting such a solution into a body of meat through needles under pressure. A certain amount of solution that is not injected into the meat usually exits the injection device and is referred to as a return solution. Typically, because of the mechanical nature of the injection device, a percentage of solid particulate material from the body of meat undergoing treatment is carried away with the return solution. When the size of the particles in the return solution exceeds the opening of the needles, the return solution cannot be recycled for injection into bodies of meat. Conventional solutions to this problem involve removing such solid materials to prevent needle plugging, thereby improving efficiency and effectiveness of the injection device.

Conventional practices comprise recirculating the return solution between the injection device and a solution holding tank in proximity thereto. Screening filters and separators are placed within or about the tank. These filters and separators remove particles, which are discarded. Conventional practices further include the addition of finer filters on the feed side of the injection device to eliminate fine particles that may have passed through the screening device. The needle injectors typically have small needle openings, such as from about 0.10 mm to about 5.0 mm in diameter, e.g., about 0.50 mm to about 2.0 mm.

Conventional approaches, however, result in the expenditure of considerable resources to maintain the screens and filters during injection and during cleaning periods. Most food processing operations still suffer needle plugging and injector problems, as well as yield loss due to solids that are removed from the product during injection. In addition, there are additional costs incurred for treating or disposing the removed solids.

Accordingly, there exists a need for improved methods for treating food with liquids by reducing or eliminating filtration of the return solution while simultaneously improving yield. There exists a particular need for methodology and systems to prevent needle plugging in injection devices employed to inject a return solution into bodies of meat.

DISCLOSURE OF THE INVENTION

An advantage of the present invention is a method and system for treating food with liquid without encountering problems due to the presence of particulate material from the food in the liquid.

Another advantage of the present invention is a method and system for reducing the particle size of particles from food products in treating liquids, thereby enabling efficient recycling of the liquid for further treatment of food.

A further advantage of the present invention is a method and system for reducing the size of particulate material in injection solutions to enable recycling of the solutions to the injection system without needle plugging or greatly reducing needle plugging.

Additional advantages and other features of the present invention will be set forth in the description which follows and, in part, will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a method comprising: treating food with a liquid; recovering the liquid after treating the food as a return liquid, wherein the return liquid contains particulate material having a first particle size resulting from treating the food; reducing the first particle size of the particulate material in the return solution to a second particle size less than the first particle size to form a reduced return liquid; and recycling the reduced return liquid to treat food.

Another aspect of the present invention is a system comprising: means for recovering a liquid containing particulate material having a first particle size after treating food with a liquid as a return liquid; means for reducing the first particle size of the particulate material in the return solution to a second particle size less than the first particle size to form a reduced return liquid; and means for recycling the reduced return liquid to treat food.

A further aspect of the present invention is a system comprising: a mechanical milling device for reducing the particle size of particulate material in a return solution, after injecting solution into a body of meat, to form a reduced return solution; and means for recycling the reduced return solution for injection into a body of meat.

Embodiments of the present invention comprise lowering the temperature of the return solution containing the particulate material from the food prior to mechanically reducing the particle size, as with a mechanical milling device. Embodiments of the present invention further include a holding tank into which the return solution is conveyed prior to chilling and comminution, and into which the reduced return solution is conveyed after comminution prior to conveying the reduced return solution to an injection device for injecting the reduced return solution into a body of meat.

Embodiments of the present invention include a system containing a holding tank comprising: first, second and third sections; a first weir between the first and second sections and extending to a first height; a second weir between the second and third sections extending to a second height greater than the first height; an inlet in the first section for introducing the return solution into the holding tank; an inlet in the second section for introducing the reduced return solution into the holding tank; and an outlet in the third section for withdrawing the reduced solution from the holding tank and conveying it to the injection device. Embodiments of the present invention also include a holding tank containing a top-down baffle positioned between the second section and the third section to form a non-turbulent zone between the top-down baffle and the third section.

Additional advantages of the present invention will become readily apparent to those skilled in this art from the following detailed description, wherein embodiments of the present invention are described, simply by way of illustration of the best mode contemplated for carrying out the present invention. As will be realized, the present invention is capable of other and different embodiments, and its several details are capable of modification in various obvious respects, all without departing from the present invention. Accordingly, the drawings and description are to be regarded as illustrative in nature, and not as restrictive.

DESCRIPTION OF THE INVENTION

Figure 1:
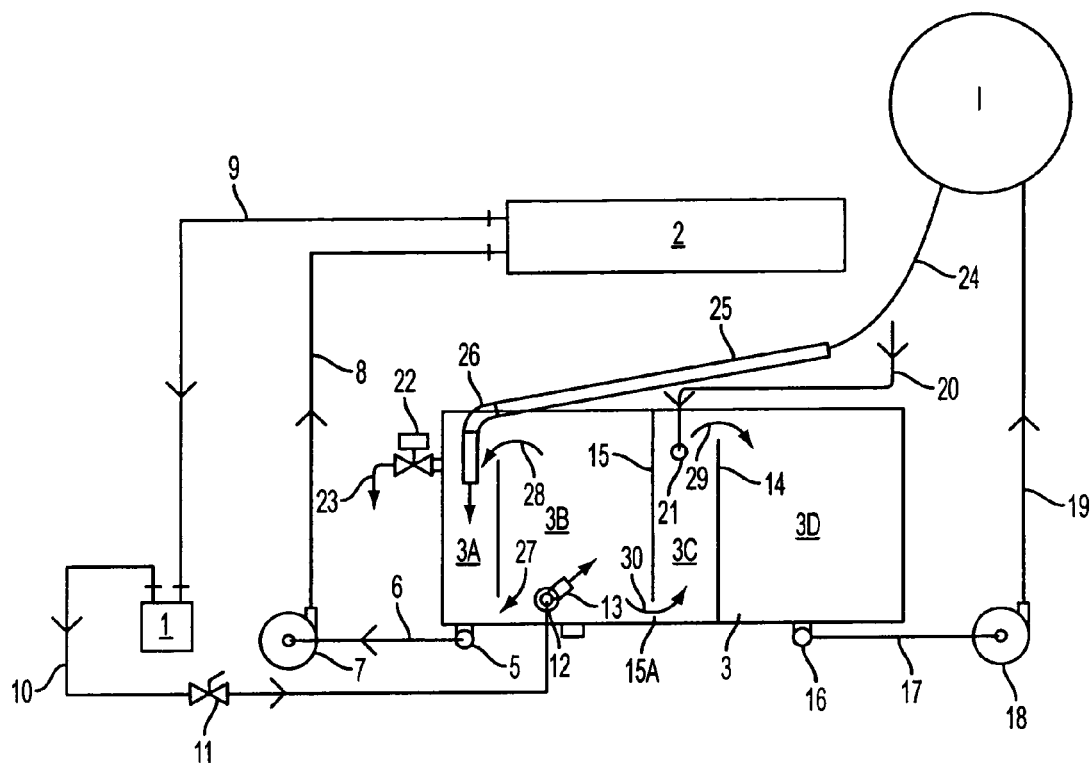
FIG. 1 schematically illustrates a system in accordance with an embodiment of the present invention.

The present invention addresses and solves problems attendant upon treating food with a liquid, as for injection of a solution, such as a brine for curing, seasoning, marinating or yield improvement, wherein the return liquid contains particles of the food. This problem is particularly queued in meat processing systems wherein solutions are injected into bodies of meat via needles under pressure and a return solution is recovered containing particles of the meat undergoing treatment, which particles exceed the size of the diameter of the needle, thereby causing plugging and reducing efficiency and effectiveness of the injection system. Conventional practices approach this problem by providing a recirculation system wherein the return solution is fed sequentially to a holding tank, screening device and then finer filters, before recycling to the injection device. This type of system expends considerable resources in maintaining the screens and filters during injection and during cleaning processes, and have not been completely successful.

The present invention addresses and solves such particular problems by strategically reducing the particle size of the particles in the return solution before recycling. As used throughout this disclosure, the word "solution" is used in a general sense and encompasses a suspension or colloid. There are various types of solutions employed to treat food in the food industry. The present invention is not limited to any particular type of liquid or solution, or treating system.

In accordance with embodiments of the present invention, the return solution, such as a return solution from an injection system containing relatively large particles greater than the diameter of the needles of the injection system, is treated to reduce the particle size of the particles in the return solution. Such particle size reduction or comminution may be implemented mechanically, as by employing conventional milling devices, such as non-contact milling devices having two spinning rotors spaced part by a distance substantially equivalent to the size to which the particles are reduced, e.g., less than 0.5 mm. Contact milling devices may also be used with appropriate cooling systems. Suitable non-contact milling devices, as well as contact milling devices, are commercially available.

Embodiments of the present invention include reducing the temperatures of the return solution prior to comminution. Means for reducing the temperature of a solution may include any conventional refrigeration or heat exchange device capable of lowering the temperature of the solution sufficient to facilitate comminution, depending upon the freezing point of the fluid and food safety concerns. Suitable temperatures include about 2° F. above the freezing point of the fluid and less than about 40° F., such as about 28° F. to 36° F.

Embodiments of the present invention include means for recovering the return solution and means for recycling the reduced return solution after comminution. Such means for recovery and means for recycling include conventional pumping systems with associated valves and conduits, and a holding tank. Embodiments of the present invention including a holding tank comprising isolated sections and flow characteristics which direct the solids toward the outlet through which the return solution is fed to the cooling device and then to the mechanical milling device. The flow characteristics of the tank are also designed to allow the milled or reduced return solution to flow toward a clean section of the holding tank to an outlet from which it is conveyed to the inlet of a pump feeding the injection system. An outlet located just below the operating liquid level is included along with a valve which recycles repeatedly and allows floating solids, such as fats, skins, and foams, to be skimmed off and to exit the system and drain with a minimal amount of solution.

A system in accordance with an embodiment of the present invention is schematically illustrated in FIG. 1. In the illustrated embodiment reference character I generally denotes an injection system comprising a plurality of needle devices through which a treating solution, such as a brine for curing, marinating or improving yield, is injected into bodies of meat. Such systems are conventional and, hence, are not discussed or illustrated in particular detail. In accordance with the illustrated embodiment a recovery means is provided by which a return solution is fed, as by gravity, through line 24 into tube 25 which passes through inlet 26 into section 3A of holding tank 3. Holding tank 3 is constructed to have three sections 3A, 3B, and 3D, and a non-turbulent zone 3C. The sections are formed by providing a first weir 13 which separates the first section 3A from the second section 3B, and a second weir 14 which separates the second section 3B from the third section 3D. Weir 14 is positioned at a greater height than weir 13, i.e., weir 14 is closer to the upper surface of the holding tank 3 than weir 13. Typically, weir 14 is positioned at a height sufficiently greater than weir 13 to create a constant flow of liquid between the second section 3B and the first section 3A, illustrated by arrow 28, which carries small and/or floating particles to section 3A and to outlet 5. A top-down baffle 15 is positioned in the second section 3B creating a non-turbulent zone 3C. During operation fluid flows under top-down baffle 15, as illustrated by arrow 30, into non-turbulent zone 3C, wherein any remaining particles settle down and are not carried over weir 14 by the velocity of the solution flowing up and over weir 14. The illustrated system further comprises means for reducing the particle size of the return solution, such as a conventional mechanical milling device 1, and refrigeration means 2 for chilling or reducing the temperature the return solution to facilitate comminution. Holding tank 3 may also be provided with additional baffles and/or weirs for various marinates or brines.

In operation, return solution containing particulate material from the injection system I is fed by gravity by line 24 into tube 25 passing through inlet 26 into section 3A of holding tank 3. Section 3A is considered a "dirty" section wherein particles having a relatively large size exist in the return solution. An outlet 5 is provided in section 3A through which the return solution is fed into line 6 by pump 7 through line 8 into refrigeration or heat exchange device 2, wherein the return solution containing the relatively large particle size particles is cooled to facilitate subsequent mechanical comminution. Subsequent to cooling to an appropriate comminuting temperature, such as to a temperature of about 28° F. to about 36° F., the return solution is pumped via line 9 into mechanical milling device 1, which is structured to reduce the particle size of the particles in the return solution to a size less than the opening in the needles of the injection device I, such as less than 0.5 mm. The return solution having the reduced particle size (reduced return solution) is then pumped through line 10, valve 11 into inlet 12 which is positioned in the center section 3B of the holding tank 3. Inlet 12 is provided with a directional inlet 13 to route the reduced return solution upwardly. Valve 11 is used to restrict the flow through the milling device in order to control particle size by slowing down the flow through milling device 1 thereby lengthening exposure time to the cutting head.

The difference in weir heights creates a constant flow of liquid between the center section 3B and the dirty section 3A, illustrated by arrow 28, to outlet 5 and eventually to outlet 5 and eventually to mechanical milling device 1 for further communition. In embodiments of the present invention, weir 13 is also provided with a small opening 27 at the bottom to allow large settling particles to migrate back to dirty section 3A and eventually conveyed to mechanical milling device 1. The top-down baffle 15 as a minimal gap at the bottom 15A. All fluid flowing to clean section 3D must pass through gap 15A, as illustrated by arrow 30, into a non-turbulent zone 3C created by the baffle 15. The surface area of the space between the top-down baffle 15 and weir 14 is sized to create non-turbulent zone 3C wherein particles can settle and are not carried over the weir 14 by the velocity of the solution flowing up and over weir 14.

Freshly chilled solution is transferred to the holding tank 3 from a make-up system which is located elsewhere in the process facility and, hence, not illustrated for simplification. Such make-up solution is fed through line 20 into inlet 21. Make-up solution and solution free of particles pass over weir 14 into clean section 3D as illustrated by arrow 29. Since the injection system consumes solution, a level sensor may be placed in the clean section 3D of holding tank 3 to detect such usage and trigger the addition of the fresh solution to the holding tank. By feeding the fresh solution between the top-down baffle 15 and weir 14 foaming is prevented and fluid flow over the weir is improved.

Any floating solids accumulate in the upper portion of dirty section 3A and are eliminated by skimming off the top portion of the liquid, e.g., about 1 to 2 inches of liquid/solids/foam, through a fitting and valve 22 into line 23. It should be understood that each system will vary with the injection percentage, type of meat, and throughput and, hence, require an adjustable cycle time on drain valve 22.

The present invention is not limited to any particular type of system for treating food with liquid. The present invention is particularly applicable to treating a return solution from a meat injection system by reducing the size of the particles therein to enable efficient recycling without clogging the injection needles.

The means for recovering the return liquid and means for recycling the reduced return liquid may comprise any of various conventional conduits with conventional valves and pumps. The holding tank in accordance with embodiments of the present invention comprises part of the means for recovering and means for recycling. The means for reducing the particle size in the return solution includes conventional contact milling devices which mechanically reduce the size of the particles, particularly non-contact milling devices. The means for lowering the temperature of the return solution prior to comminution includes conventional refrigeration devices and any conventional heat exchange systems.

The present invention is applicable to any of various types of injection systems for injecting bodies of meat with various types of pickling brines, curing solutions, marinating solutions or yield improving solutions. Such solutions include water, salt, phosphates and additional components depending on the particular application, such as sugar, flavorings, antimicrobial additives, starches and proteins. The present invention is not limited to treating any kind of food product but includes various types of meat, meat products, poultry, poultry products, fish and fish products, including boneless and bone-in products.

The present invention provides various advantages vis-à-vis conventional practices related to recycling solution in meat injection systems. For example, embodiments of the present invention eliminate the need for filters and their related clogging and cleaning issues, eliminate foaming, and effectively mix and maintain ingredients in suspension. Embodiments of the present invention capture partials and fuse them back into the muscle as green weight, enhance the binding properties of muscle, capture particles in solution, reduce them and returns them to the meat thereby increasing yields and reducing waste. The use of an optional chiller improves performance of the mechanical milling device and maintains the brine below the safe product holding temperatures. The present invention effectively clarifies injection brines by allowing the heavy solids to drop out and to be remilled, enables removal of uncut particles to be remilled, and eliminates needle clogging. Advantageously, the present invention prevents external contamination associated with an open vessel, enables the addition of off-line trim to the product, is applicable to single or multi cut head and enables multiple passage through the mechanical mill to maintain particle size at a minimum.

The present invention enjoys industrial applicability in any of various types of food processing systems wherein food is treated with a liquid, such as systems for chilling food products, systems for sanitizing and/or improving the resistance of food to bacterial growth. Embodiments of the present invention enjoy particular industrial applicability in recycling return solution used to inject bodies of meat through needles.

In the previous description, numerous specific details are set forth, such as specific materials, structures, chemicals, processes, etc., to provide a better understanding of the present invention. However, the present invention can be practiced without resorting to the details specifically set forth. In other instances, well known processing and materials have not been described in detail in order not to unnecessarily obscure the present invention.

Only the preferred embodiment of the present invention and but a few examples of its versatility are shown and described in the present application. It is to be understood that the present invention is capable of use in various other convolutions and environments, and is capable of changes or modifications within the scope of the inventive concept as expressed herein.

What is claimed is:

1. A method for recycling a processing liquid utilized in treating food, the method comprising:
   treating food with a liquid;
   recovering the liquid after treating the food as a return liquid, wherein the return liquid contains particulate material having a first particle size resulting from treating the food;
   reducing the first particle size of the particulate material in the return solution to a second particle size less than the first particle size to form a reduced return liquid;
   conveying the reduced return liquid to a holding tank; and
   recycling the reduced return liquid from the holding tank to treat food, wherein the holding tank comprises:
   first, second and third sections;
   a first weir between the first and second section and extending to a first height; and
   a second weir between the second and third sections and extending to a second height greater than the first height;
   the method comprising conveying the reduced return liquid to the second section of the holding tank.

2. The method according to claim 1, further comprising conveying the return liquid to the first section of the holding tank before forming the reduced return liquid.

3. The method according to claim 2, further comprising:
   removing the return liquid from the holding tank; and
   chilling the return liquid removed from the holding tank to a lower temperature before forming the reduced return liquid.

4. The method according to claim 3, further comprising chilling the return liquid to a temperature above the freezing point of the return liquid to less than about 40° F.

5. The method according to claim 1, wherein the second height is up to 5 percent greater than the first height.

6. A method for recycling a liquid solution utilized in treating at least one body of meat, the method comprising:
   treating food by injecting the liquid solution into the at least one body of meat through an injection device comprising a needle having an opening;
   recovering a return solution comprising particulate material having a first particle size;
   reducing the first particle size of the particulate material in the return solution to a second particle size less than the first particle size to form a reduced return solution;
   conveying the reduced return solution to a holding tank; and
   recycling the reduced return solution from the holding tank to inject into a body of meat through the needle, wherein the holding tank comprises:
   first, second and third sections;
   a first weir between the first and second sections and extending to a first height; and
   a second weir between the second and third sections and extending to a second height greater than the first height;
   the method further comprising conveying the reduced return solution to the second section of the holding tank.

7. The method according to claim 6, further comprising conveying the return solution to the first section of the holding tank before forming the reduced return solution.

8. The method according to claim 7, further comprising:
   removing the return solution from the holding tank; and
   chilling the return solution removed from the holding tank to a lower temperature before forming the reduced return solution.

9. The method according to claim 8, further comprising chilling the return liquid to a temperature above the freezing point of the return liquid to less than about 40° F.

10. The method according to claim 6, wherein the second height is up to 5 percent greater than the first height.

11. The method according to claim 2, further comprising mechanically reducing the first particle size to the second particle size.

12. The method according to claim 7, further comprising mechanically reducing the first particle size to the second particle size.

13. A method for recycling a processing liquid utilized in treating food, the method comprising:
   treating food with a liquid;
   recovering the liquid after treating the food as a return liquid, wherein the return liquid contains particulate material having a first particle size resulting from treating the food;
   reducing the first particle size of the particulate material in the return solution to a second particle size less than the first particle size to form a reduced return liquid;
   conveying the reduced return liquid to a holding tank including first and second sections, and a first weir between the first and second section and extending to a first height; and
   recycling the reduced return liquid to treat food.

14. The method of claim 13 wherein the holding tank includes first and second and third sections, and a second weir between the second and third sections and extending to a second height, and wherein the step of conveying the reduced return liquid comprises conveying the reduced return solution to the second section of the holding tank.

* * * * *